United States Patent [19]

Lotz

[11] Patent Number: 5,056,331

[45] Date of Patent: Oct. 15, 1991

[54] ENCLOSURE FOR ELECTRONIC EQUIPMENT

[76] Inventor: Paul B. Lotz, 1860 Schwenksville Rd., Schwenksville, Pa. 19473

[21] Appl. No.: 567,187

[22] Filed: Aug. 14, 1990

[51] Int. Cl.$^5$ .................. F25D 11/00; F25D 15/00; B60H 1/32

[52] U.S. Cl. .................. 62/237; 62/239; 165/80.3

[58] Field of Search .......... 62/239, 237, 448, 449, 62/450, 337, 441, 246, 249, 251, 258; 312/236; 165/80.2, 80.3, 80.4

[56] References Cited

U.S. PATENT DOCUMENTS

| | | | |
|---|---|---|---|
| 2,178,042 | 10/1939 | Justheim | 62/251 |
| 3,134,886 | 5/1964 | Simpson | 312/236 |
| 3,192,306 | 6/1965 | Skonnord | 312/236 |
| 3,199,579 | 8/1965 | Foster et al. | 62/448 |
| 3,224,221 | 12/1965 | Raskhodoff | 165/80.3 |
| 3,730,603 | 5/1973 | Looms | 312/236 |
| 4,234,526 | 11/1980 | MacKay et al. | 312/236 |
| 4,505,131 | 3/1985 | Boxall | 62/448 |
| 4,626,048 | 12/1986 | Goodlander | 312/236 |
| 4,728,160 | 3/1988 | Mondor et al. | 312/236 |
| 4,949,218 | 8/1990 | Blanchard et al. | 312/236 |

*Primary Examiner*—Albert J. Makay
*Assistant Examiner*—William C. Doerrler

*Attorney, Agent, or Firm*—Eckert Seamans Cherin & Mellott

[57] ABSTRACT

An enclosure for electronic equipment, especially for electronic equipment such as laser printers that must be protected from dirt and dust. The enclosure is a stand along casing having, for instance, a small, self-contained air conditioning unit contained therein. The electronic equipment is supported on a horizontal support surface which forms the top of the case. The enclosure has two main embodiments; a partial covering for the electronic equipment, located adjacent the horizontal surface, and a total cover over the entire horizontal surface. In each, filtered air drawn by the air conditioner is directed beneath the cover by baffles within the case. In the partial cover, the cover abuts an air input vent on the electronic equipment and conditioned, i.e. clean air from the conditioner is forced within the equipment casing at a high rate to prevent ingress of dirt therein. Conditioned air is directed into the total cover to form a blanket of air around the enclosed electronic equipment to prevent dirt from intruding. The air conditioning unit preferably has means for cooling and/or warming the conditioned air to modify the temperature of the enclosed electronic equipment as necessary to provide optimal operation of the equipment. Dehumidifying means are includable in or out of combination with temperature modifying means.

39 Claims, 4 Drawing Sheets

ENCLOSURE FOR ELECTRONIC EQUIPMENT

BACKGROUND OF THE INVENTION

1. Field of the Invention

This invention relates to enclosures for electronic equipment, and in particular to a stand alone dust and debris free enclosures for laser printers and the like, with means for air conditioning.

2. Prior Art

Electronic devices, by their very nature, contain components and parts that operate at varying degrees of electrical potential under normal operation. Dust and particulate matter which reside in the air become electrostatically charged and by electrostatic attraction can be drawn into the cabinet of an electronic device where they adhere to an oppositely charged component or part. Certain forms of electronic equipment such as photocopiers and laser printers include charged drums, which aggravate problems with electrostatic attraction. Other devices such as CRTs have components at very high potential. Whether or not the device uses electrostatic charge in operation, accumulation of dust and dirt greatly affects device performance and often its useful life. Of course, the dirtier the ambient air, and/or the higher the potential which exists on the electronic components and parts, the higher the rate of accumulation of the damaging, performance affecting matter. Furthermore, moisture may be absorbed in the accumulated dust.

Simply encasing the electronic device within a dust-tight cabinet is not a sufficient remedy. Electric and electronic devices dissipate heat. Enclosing a device in a dust-excluding enclosure reduces air exchange and traps the heat. While one could improve dust isolation, accumulation of heat would be greater. Conversely, opening pathways for air transfer allows ingress of dust. A fully air-tight enclosure as necessary for very good dust isolation traps most of the heat dissipated by an electronic device and may allow it to build to excessive levels. Heat can adversely affect electronic and mechanical components, or at least affect the operation of thermally sensitive components such as semi-conductors which are also affected adversely by excessively cold temperatures. It would be appropriate, therefore, to provide some sort of ventilating or air conditioning means not inconsistent with the general object of providing a dust free enclosure. In addition, such an enclosures should allow access to the equipment therein, particularly where the equipment includes a printer or photocopier that requires the user to load and remove sheets.

Prior art structures for protecting and/or cooling electronic devices include, for example, U.S. Pat. No. 4,493,267-Jedziniak. Jedziniak discloses a shelfing system for use with a data processing device, such as a personal computer. The disclosure provides means for affixing a terminal and a keyboard to the shelf system, thereby preventing unauthorized removal. Cooling blowers in the shelf surface are further provided. Blowers which merely increase airflow through a device can be counterproductive as they are powered means to draw dust into an enclosure. An effective means for completely enclosing a data processing device for clean and cool operation is not disclosed.

Computers and the like are characterized by a large number of densely mounted electronic components, including temperature sensitive semiconductors. Hastings, U.S. Pat. No. 4,589,712 discloses a cylindrical enclosure for housing electronic data processing equipment. Within the enclosure is a rack system with interconnected hollow support members which carry and emit blown cooled air. The rack itself is mounted on a turntable within the enclosure for rotating the equipment, reducing stagnation and heating of the ambient air. This device solves some of the problems associated with blowing air into an electronic device, but does not permit ready access to the contained electronic device.

U.S. Pat. No. 4,626,048 to Goodlander discloses a printer housing. The housing is a complete enclosure which is designed to be incorporated into a partitioning wall. The enclosure is openable from either side by way of hinged door panels, the printer being on a slidable shelf for easy access thereto. The enclosure is lined with sound deadening material and has means for drawing in air. Therefore, to some extent, the ventilating apparatus will also tend to collect dust. Since the device is designed to be incorporated into a wall, it is not readily movable.

U.S. Pat. No. 4,728,160 discloses a cabinet for an entire computer system. The cabinet has separate enclosures for each of the computer sub-systems. The cabinet includes cooling means for maintaining suitable ambient temperatures of the enclosed computer system. The device is an example of a large unit wherein the cooling and isolation from dust are addressed in the design of the unit as a whole. Where a user wishes to protect and manipulate the operating temperature of a prepackaged electronic device such as a printer, photocopier, etc., the user cannot practically redesign the unit for use on a particular premises where heat or dust may be a problem. The Mondor and Hastings references also disclose enclosures for housing self contained computer systems. There is no need to allow quick and repeat access to the contained devices.

It is necessary to have free and frequent access to a contained device when that device is, for example, a printer. Paper cassettes must be replaced, copies removed and often times paper jams must be cleared. Photocopiers further require access for loading originals. The prior art structures of Mondor and Hastings do not allow the necessary access to such enclosed devices.

Goodlander discloses a computer printer housing, having doors for easy accessibility. However, the device of Goodlander is a permanent structure made to be incorporated into a partitioning wall. Furthermore, the primary objective is the provision of sound-deadening means. Dust and dirt impermeability is not considered or disclosed, probably due to the relatively clean office environment where computer printers and the like are generally installed.

There is a need to provide an enclosure for electronic equipment which is movable and allows easy and ready access to the housed equipment. The enclosure must provide free access, adequate conditioning ventilation, and an impermeable barrier to dust and debris. Whereas these requirements are to some extent inherently conflicting, there is a need to optimally resolve them in a way that is applicable to generally available small scale printers, photocopiers and similar equipment. The enclosure could house items such as, for instance, laser printers in relatively dirty and dusty environs. Laser printers develop quite high voltages and are therefore extremely susceptible to air borne dust and dirt particles. The enclosure as herein provided has self-contained means for conditioning the air such as an on board air conditioning unit, a heat pump or perhaps a forced air fan and filter combination, in a portable carriage, for instance mounted on caster wheels, with substantially complete isolation from dust together with means to access the printer for service and operation.

SUMMARY OF THE INVENTION

It is a general object of this invention to provide an enclosure for equipment such as general purpose office equipment, especially electronic equipment, e.g., printer and copiers.

It is also an object of this invention to provide an enclosure for electronic equipment wherein the enclosure includes air conditioning and air circulating means which do not vacuum dust into the equipment.

A further object of the invention is to provide the above-mentioned enclosure with easily accessible compartments.

Still another object of the invention is to provide an enclosure with air conditioning and circulating means that further provides an impermeable barrier to dust and dirt.

It is a further object of the invention to provide an enclosure for electronic equipment that is easily movable for use anywhere in a facility.

As means of accomplishing the above-listed objectives, a rack-like structure is provided. Mounted on the rack is a relatively small air-conditioning unit such as a self contained window air conditioner of the know type having air cleaning, cooling an dehumidifying functions. A heat pump or similar air circulating conditioning unit such as a fan and filter combination can also be utilized in accordance with the objects of the invention. The air conditioning unit contributes to the dust and dirt impermeability of the enclosure as explained below.

Two types of enclosures are within the scope of this disclosure. One enclosure is a partial enclosure; the other is a full enclosure.

The partial enclosure has a cart or wagon-like structure with irregular side panels, a rectangular section of each side panel extending higher than the remainder of the panel. A platform for supporting the electronic equipment is placed across these extended sections. The platform has holes therein for conveying conditioned air to the base of the supported electronic equipment, for instance a printer. A hinged, dome-like cover is pivotally connected to the rear panel adjacent the non-extended portion of the side panels. A second platform is supported within the non-extended sidewalls for accommodating accessories such as printer cassettes, printer paper, etc.

When the cover is in place, conditioned, i.e. clean air from the air conditioning exhaust inundates the wagon-like structure and flows upwardly into the dome-like cover. The cover has insulating material about its edges for sealingly mating with the wagon edges and the, for instance, printer side. Conditioned air from the dome-like cover is forced into and can be drawn through fan vents in the printer by an exhaust fan provided in many state-of-the-art printers. The flow rate of the air conditioning unit or fan is greater than the flow rate of the printer fan. Conditioned, i.e. clean air therefore is forced into the printer at a rate higher than it is exhausted. A positive pressure of conditioned air builds within the printer to repel dust and dirt. Means for heating or cooling the conditioned air are preferably included to assist in maintaining an acceptable temperature of the interior electronics.

A number of modifications and additions are possible and preferred. For instance the top platform may have an insulating material about its periphery for sealingly engaging the underside edges of the printer so as to trap conditioned air beneath the printer. A contact switch can also be incorporated to prevent operation of the printer while the cover is open. A number of readily accessible storage spaces can also be incorporated into the cart. These spaces may be open or closed to dust, as desired, the space occupied by the electronic equipment being nevertheless isolated.

In the full enclosure embodiment, the printer platform extends for the length of the unit and is affixed, for example, to a partially open cart like structure. The closed end of the cart like structure holds the air-conditioner housing. This housing is essentially rectangular with an air input opening essentially directly opposed to an opening intended to accommodate the air-conditioning unit. An essentially horizontal barrier transverses a cross section of the housing to divide the housing into air intake/air exhaust sections. The barrier is sealed to the air conditioning unit, for example being attached just above the air intake opening and dividing the air conditioning opening in half to separate the dust laden air at the air intake vents on the air-conditioner from the dust-free exhaust vents. The cover is an essentially long dome-like structure which extends, when closed, for the length and width of the printer platform.

In operation air is drawn by the air conditioning intake through the air intake opening in the housing. This air is preferably drawn through a filter media attached to the outside of the housing. Conditioned, i.e. clean air exhausted by the air conditioner is separated from the intake path by the aforementioned barrier and is directed upwards into the closed cover through the housing top. Conditioned air builds up within the cover at a rate faster than it can escape through, for instance, small escape holes or a slot in the dome-like cover for accessing the printer output.

It is preferable to provide insulating material about the base of the cover for preventing the escape of conditioned air.

A further preferable addition is the use of a hydraulic cylinder attached between the cart and the hinged cover for damping the action of the heavy cover. The cover, when closed, should also engage a latch mechanism for holding it securely in place.

Additional aspects of the invention will be apparent from the following discussion of exemplary embodiments.

DETAILED DESCRIPTION OF THE PREFERRED EMBODIMENTS

The invention relates to enclosures for electronic equipment such as printers. The enclosure is equipped with a relatively small, self contained air conditioning unit to provide air conditioning and perhaps thermal modification for the electronic equipment. The air conditioning unit can comprise all or part of a window mounted air conditioning device of the know type having air cleaning, cooling and dehumidifying functions, heat pump or fan and filter combination. Due to the unique design of the enclosure, the forced conditioned, i.e. cleaned air exhausted by the air conditioning unit contributes to the resistance of the enclosure and printer to invading dust and dirt particles. The invention therefore meets high standards of conditioning and dust exclusion while accommodating off the shelf electronic components such as printers, without modification.

Figure 1:
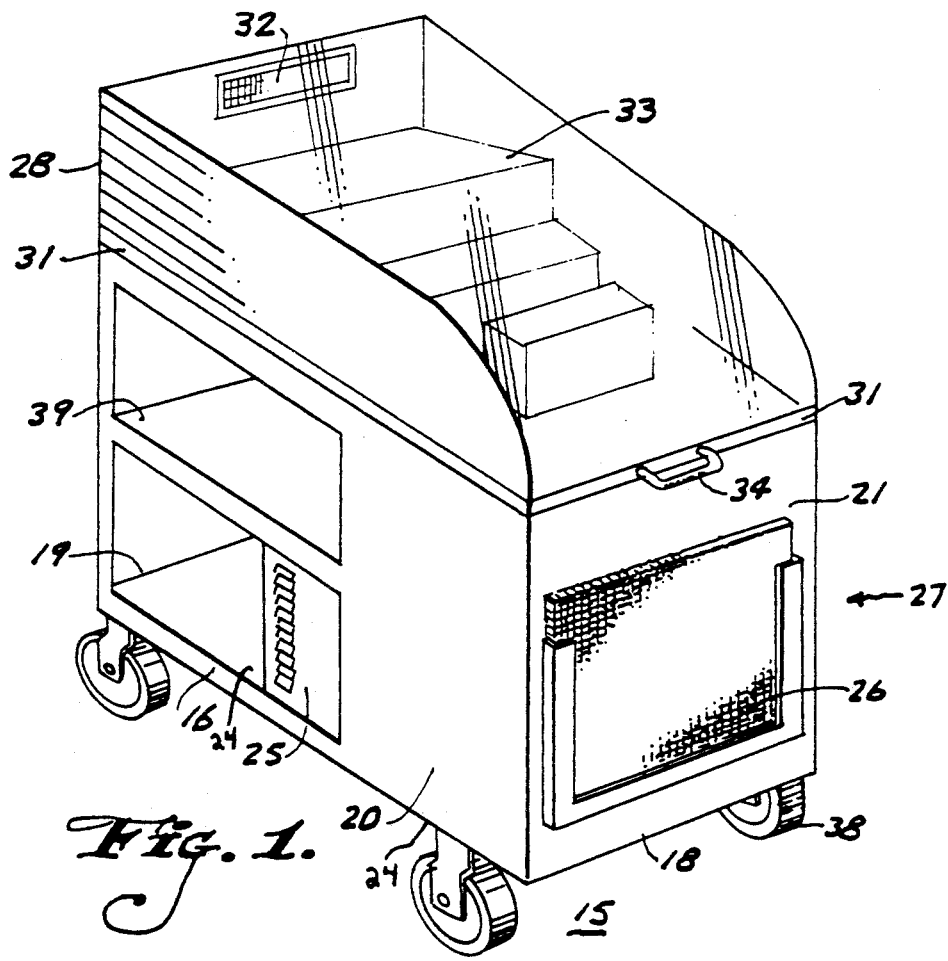
FIG. 1 is a perspective view of the enclosure wherein the heat dissipating electronic component is completely covered.

With respect to the preferred embodiments of the enclosure, FIG. 1 is a perspective view of an embodiment wherein the electronic equipment is completely enclosed.

Base frame 15 is comprised of left side member 16, right side member 17 (not shown in FIG. 1), front member 18 and rear member 19. Left vertical panel 20 rises from left side member 16. Front vertical panel 21 rises from front member 18. Similarly, but not shown in FIG. 1 right vertical panel rises from right side member 17.

Figure 2:
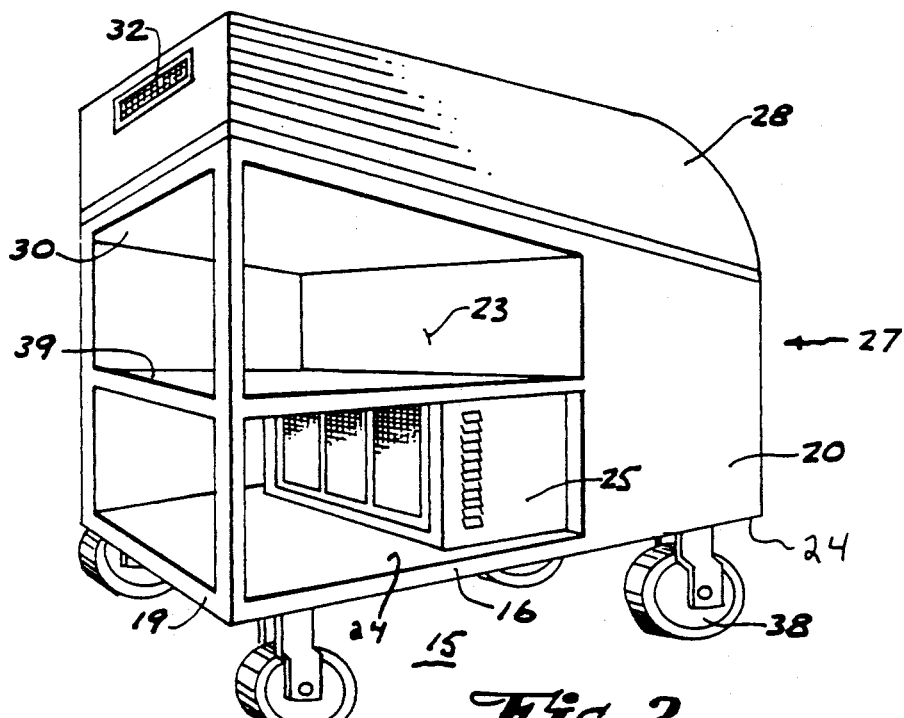
FIG. 2 is a perspective view showing the air conditioning unit partially mounted within the housing.

Referring to FIG. 2, air conditioning panel 23 abuts left vertical panel 20, and right vertical panel 22 and is directly opposite front vertical panel 21, which itself abuts left and right vertical panels 20, 22 to form a four sided housing having a substantially enclosed internal cavity. The housing bottom is covered by bottom horizontal panel 24. Air conditioning panel 23 has an opening therein for accepting the face end of air conditioning unit 25. Air conditioning unit 25 is sealingly fit into the opening in air conditioning panel 23 in an air tight manner, excluding passage of dust or escape of conditioned air.

As seen in FIG. 1, front vertical panel 21 has air intake opening 26 therein. This opening could also be placed in a different one of the vertical panels, for example left vertical panel 21 or right vertical panel 22. It could also be located in bottom horizontal panel 24.

Figure 4:
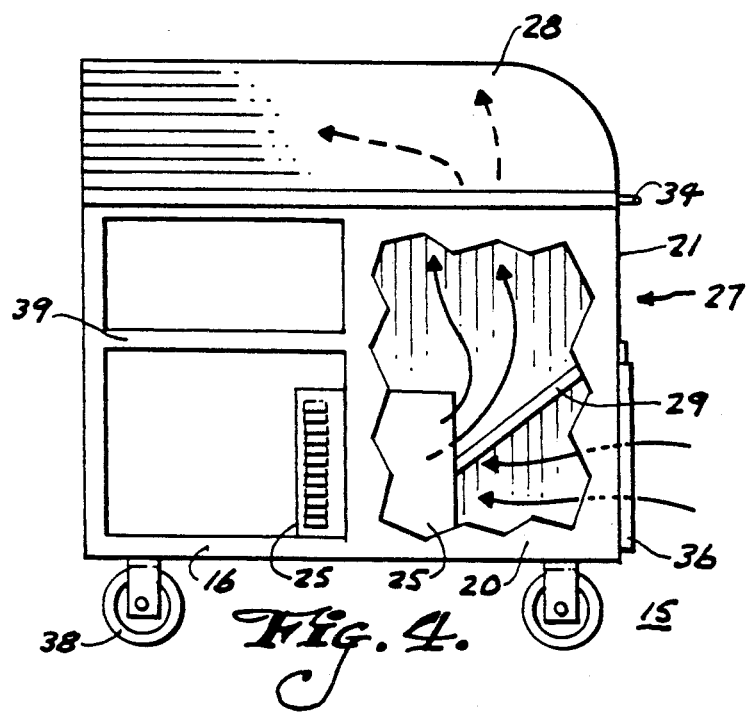
FIG. 4 is a side elevation view with the housing cutaway showing the housing barrier.

Referencing FIG. 4, a side cut-away view of the enclosure, air conditioning unit 25, which as shown can be a self contained window mount air conditioner as known in the art, having air cleaning, cooling and dehumidifying functions a heat pump or other type of air circulating means, having air intake vents along its lower face and cool air exhaust vents at its upper face, draws air though air intake opening 26 in front vertical panel 21. Conditioning unit 25 preferably has means for thermal modification of the conditioned air. Conditioned air exhausted by air conditioning unit 25 is forced up through housing 27 into the area under cover 28.

The air intake is separated from the exhaust in housing 27 by barrier 29. Barrier 29 traverses the entire cross section of housing 27 and sealingly engages left and right vertical panels 20, 21 in an air tight manner. Barrier 29 further sealingly engages front vertical panel 21 at a point just above air intake opening 26. Barrier 29 transverses the opening in air conditioning panel 23 at a point between the intake and exhaust vent on air conditioning unit 25. Barrier 29 sealingly engages the face of air conditioning unit 25 to form an air-tight seal between the intake and exhaust vents of air conditioning unit 25.

Horizontal surface 30 extends from adjacent housing 27 to the opposite end of the enclosure. An electronic component, such as a laser printer 33, photocopier or the like, and its associated components such as paper cassettes and trays, are placeable on horizontal surface 30. Cover 28 has a resilient insulating material, such as insulating foam 31, about its edges.

When cover 28 is closed, as in FIG. 4, insulating foam 31 provides an air tight seal between cover 28 and base frame 15. Conditioned, clean air rising from housing 27 inundates the space defined beneath cover 28 and top of horizontal surface 30 to adjust, if necessary, the temperature of the air surrounding the electronic equipment, preferably the laser printer 33 contained therein. Air is exhausted, albeit at a lesser rate than input, by, for instance, slot 32 in cover 28 for printer output or by holes in horizontal surface 30 (not shown). The combination of the complete enclosure and the constant flow of clean air emanating from any opening in the enclosure provides a complete and effective barrier to dirt and dust, which otherwise might accumulate due to air flow through printer 33, and electrostatic attraction of the dust to charged surfaces.

Figure 3:
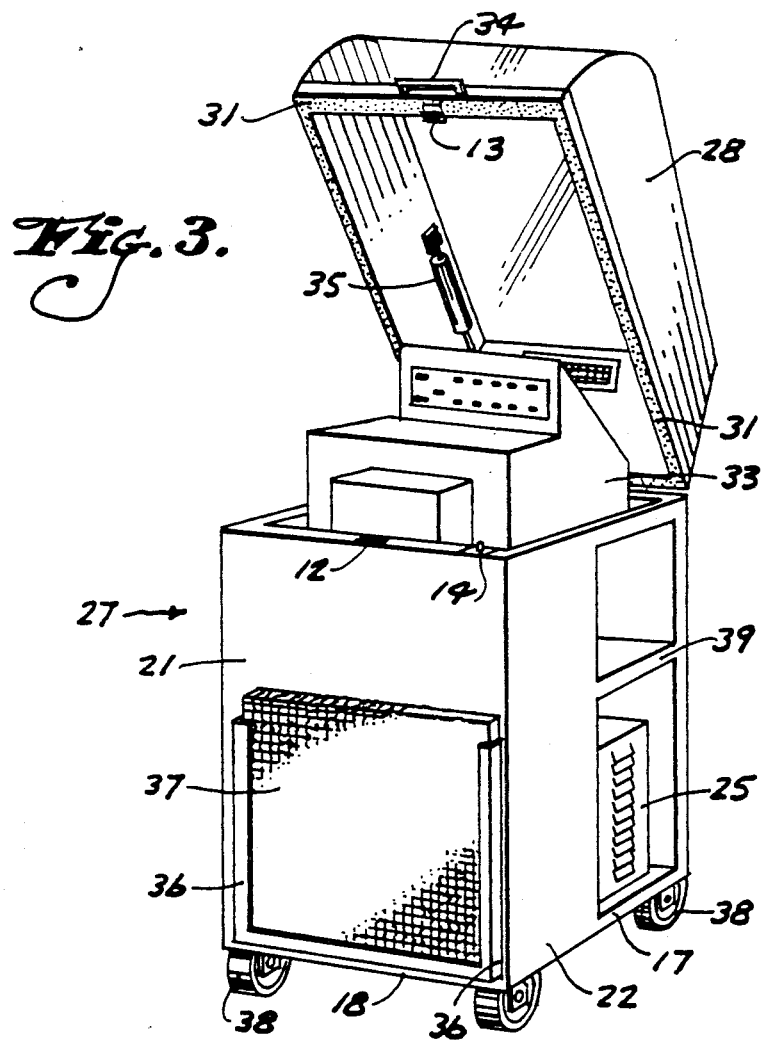
FIG. 3 is a front perspective view of the enclosure according to FIG. 1.

As seen in FIG. 3, cover 28 can have handle 34 and hydraulic cylinder damping mechanism 35 for easily opening and closing relatively large cover 28.

As the invention concerns maintaining the cleanliness of electronic devices, especially laser printers, it is preferable to exclude dust from the air conditioner as well, insofar as possible. This also improves the efficiency of the air conditioner by keeping heat exchange surfaces clean. A filter purifies the air drawn by air conditioning unit 25, trapping any dust therein. A filter can also be included on the output side. Referring to FIG. 3, slotted frame 36 securely holds filter 37. Filter 37 can be for example, a furnace filter of the known type. Any air drawn into housing 27 will have dirt, dust and particulate matter removed by filter 37 so that only pure, conditioned air is directed up to the enclosed electronic equipment.

Contact switch 14 is installed on the upper edge of, for instance, front vertical panel 21. Contact switch 14 is of the known type whereby an electrical circuit is opened upon its release. Contact switch 14 can accordingly be used to disconnect power, for example, from printer 33 to disable the printer 33 or at least its exhaust fan upon opening of cover 28.

Cover 28 can also contain cover latch 13 to engage with complementary base latch 12 to securely latch cover 28 in place. In order to provide for easy transport of the enclosure about the work area, caster wheels, are provided. Caster wheels 38 are fixedly located, for instance, at the corners of base cart 15.

The above listed preferred embodiments are not intended as limiting. For instance storage shelf 39 can also be included as part of base frame 15. Furthermore, cover 28 can be constructed of a opaque material or preferably a transparent plastic for monitoring printer operation.

FIGS. 5-9 depict alternate embodiments of the device wherein only partial coverage of electronic equipment is affected and the air intake and exhaust means of the electronic equipment such as a printer are utilized in the dirt accumulation preventing and the temperature modification objects of the invention.

Figure 5:
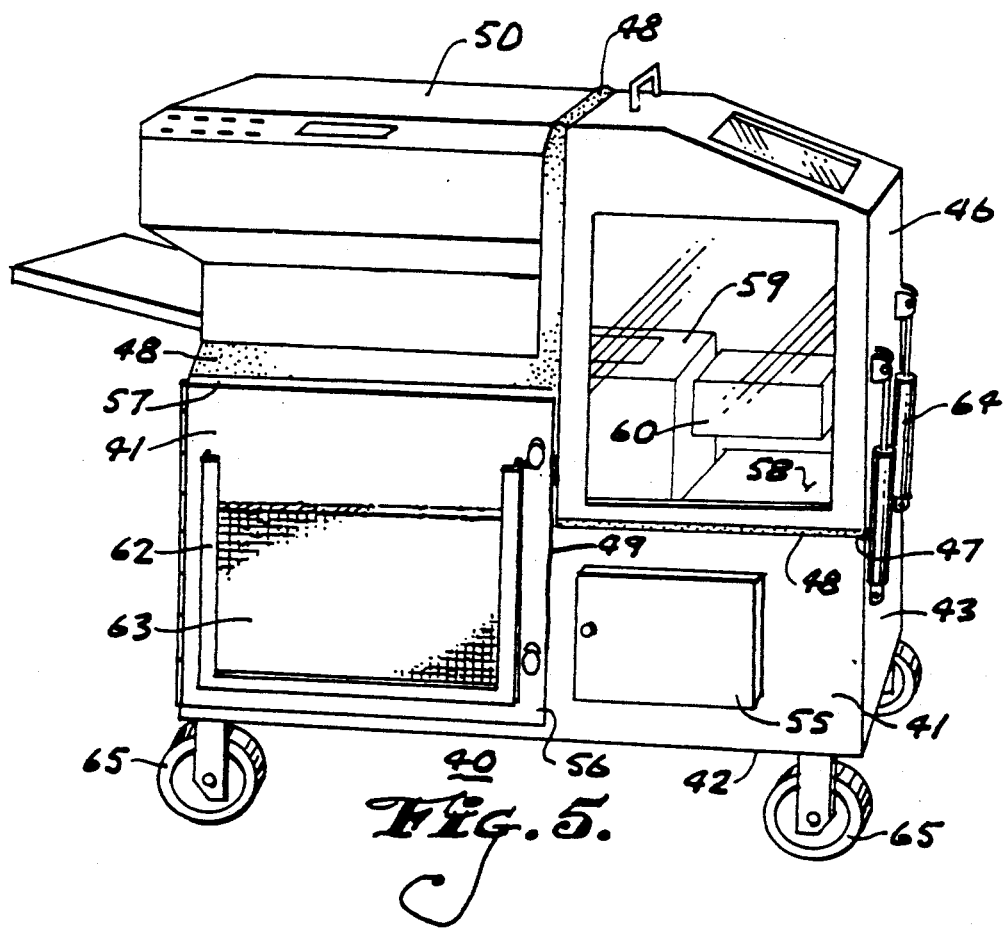
FIG. 5. is a perspective view of the enclosure wherein the electronic component is not completely covered.
Figure 7:
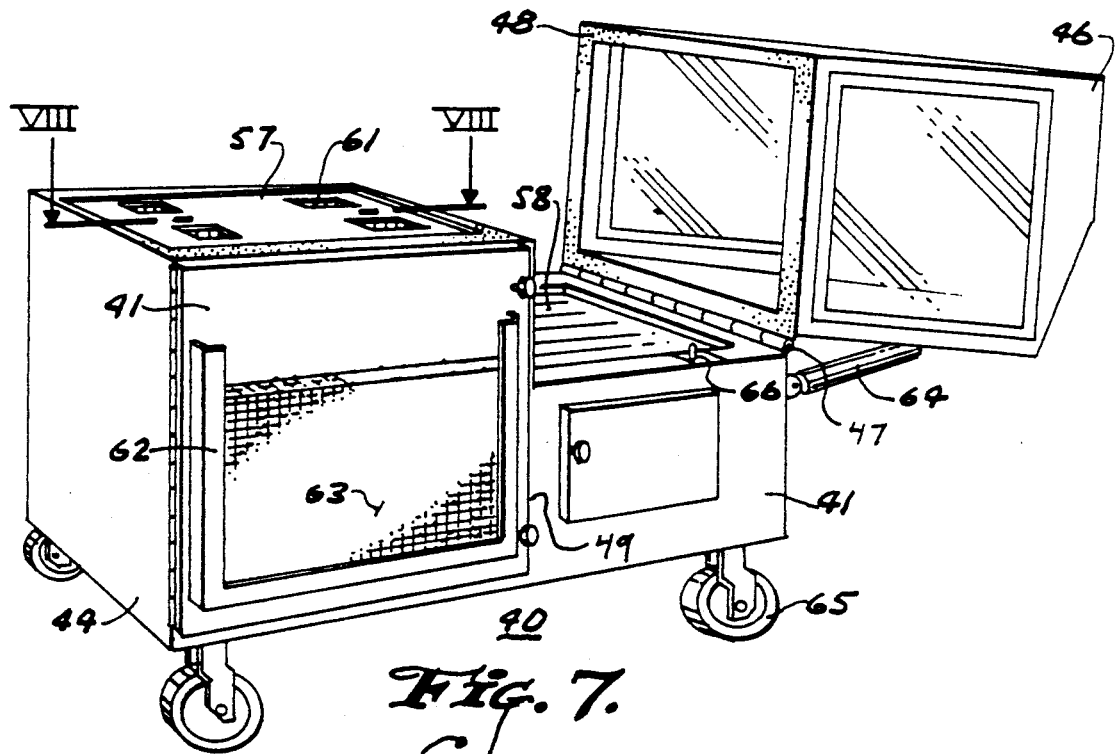
FIG. 7 is a perspective view of the enclosure according to FIG. 5 showing the cover in an open position.

Referring to FIG. 5, a perspective view of the enclosure, base cart 40 has left side panel 41, bottom panel 42, rear panel 43 and front panel 44 (see FIG. 7). Right side panel 45 (not shown) is a mirror image and directly opposed to left side panel 41. Cover 46, is hingingly attached to rear panel 43 by hinges 47. Cover 46 has a resilient insulating foam 48 about it periphery for forming an air tight seal, when closed, about the top edges of rear panel 43, right side panel 45, left side panel 41 and vertical extensions 49, 50 of left side panel 41 and right side panel 45, respectively, as well as the air intake sides of, for instance, printer 50.

Figure 6:
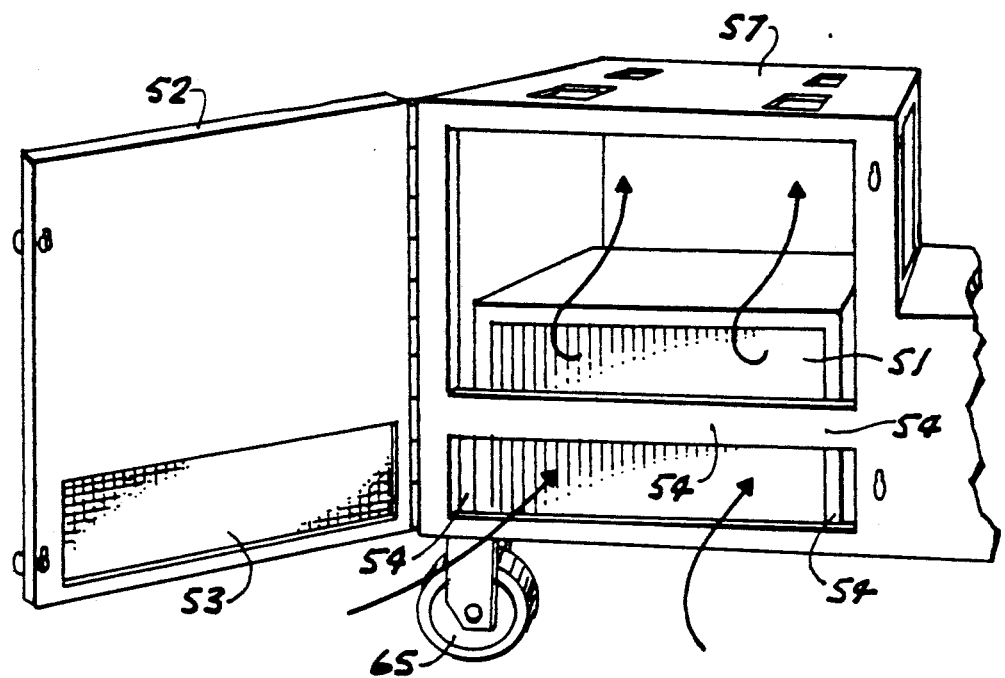
FIG. 6. is a front elevation view showing a panel door open and the air conditioning unit and intake barrier mounted therein.

As shown in FIG. 6, left side panel 41 has openable door 52 for accessing air conditioning unit 51 housed therein. The location of door 52 as shown is not limiting. Any or all of the left side panel 41, right side panel 45 and front panel 44 could house door 52.

Door 52 has lower air input opening 53, which may be a lattice grille, for allowing free flow of air to the air intake ports of air conditioning unit 51 when door 52 is closed.

Figure 9:
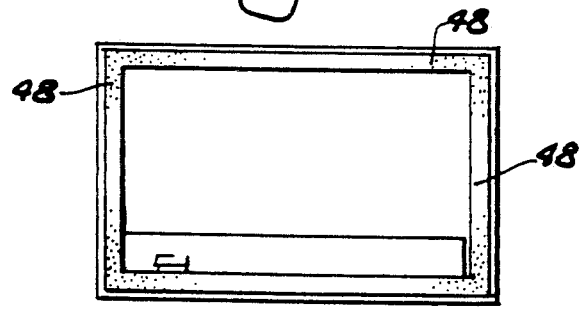
FIG. 9 is a section view along lines 9—9 in FIG. 8 showing the vertical conditioned air output opening.

Air conditioning unit 51 draws ambient air through air input opening 63. Conditioned air is exhausted from air conditioning unit 51 into the interior cavity of base cart 40. Intake barrier 54 is a substantially rectangular frame that sealingly engages the lower air intake portion of air conditioning unit 51. When door 52 is in the closed position, barrier 54 insulatingly engages the interior of door 52 for providing an air tight enclosure therebetween. In this manner, the air intake section of the air conditioning unit 51 is sealed off from the cavity of base cart 40. Air conditioning unit 51 is partially set back away from door 52 to allow for insertion of barrier 54. Conditioned air, i.e. clean air from air conditioning unit 51 inundates the interior of base cart 40. It is preferable to provide a partitioning wall 56 within base cart 40, directly opposite, and essentially equal in height to rear panel 43 to prevent wasteful diffusion of conditioned, perhaps thermally modified air into the remainder of base cart 40. In this vein secondary door 55 is provided for accessing the partitioned area so that it may be used for storage. Conditioned air is then forced into cover 46 through the opening defined by primary horizontal surface 57, secondary horizontal surface 58 and partitioning wall 56. A cross section of this opening is shown in FIG. 9. Conditioned air from within cover 46 is forced into vents (not shown) on a side of laser jet printer 50 at a rate higher than can be exhausted by the printer exhaust fan. A positive pressure of conditioned air develops within, for instance, printer 50 and leaks from any vents or openings in its casing. Dirt and dust are thus prevented from entering while the interior of printer 50 is maintained at an acceptable temperature. Secondary horizontal surface 58 supports, for instance, the paper cassette 59 and stacks 60 of paper to be input to printer 50. The enclosure is sufficiently wide to allow conditioned air to pass into the cover 46 regardless of the presence of any paper cassettes or stacks.

Figure 8:
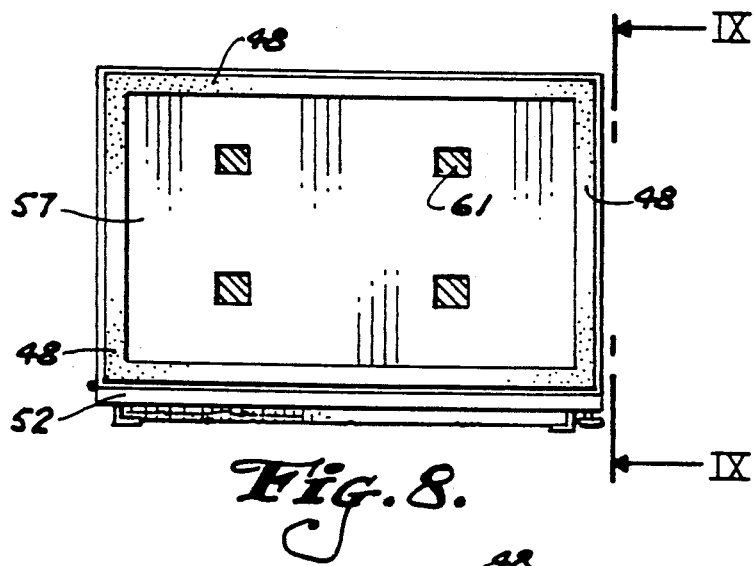
FIG. 8 is a section view along lines 8—8 in FIG. 7, showing the primary horizontal surfaces.

Additional temperature control of the printer is provided by vents 61 in primary horizontal surface 57. Conditioned, perhaps thermally modified air from within base cart 40 can travel through vents 61 to cool or heat the base of printer 50 or enter vents in the bottom of laser jet printer 50. It is preferable, therefore, to provide an air tight seal around the periphery of primary horizontal surface 57 for sealingly engaging the bottom of printer 50. This air tight seal can be provided, for example, by affixing insulating foam 48 around the periphery of primary horizontal surface 57 as shown in FIG. 8, to accommodate the dimensions of printer 50.

In agreement with the objects of the invention, filter frame 62 is provided for securing filter element 63 across air input opening 53. In this manner, airborne impurities are removed from air drawn into the air conditioning unit 51 so that only pure air is circulated. Filter element 63 can be for example, of the known furnace filter type. Filter element 63 is slidingly inserted into frame 62 although any other method of securing filter element 63 across input opening 53 can be substituted.

In FIGS. 5 and 7, hydraulic cylinder 64 is pivotally attached at its ends to cover 46 and rear panel 43. Hydraulic cylinder 64 damps the rotational inertia of cover 46 to allow for easier opening and closing of cover 46.

Base cart 40 should be easily movable to different locations within a facility. To accomplish this objective wheels 65 are attached at each of the corners of base cart 40.

Various modifications and options are contemplated within the scope of this invention. Cover 46 can have transparent panels to allow viewing of the printer feeder mechanism. Cover 46 can also have a latched closing mechanism but this is not necessary as the size of the cover and its rotational inertia will provide a tight closure. Contact switch 66 is preferably provided to disable operation of the printer when cover 46 is opened.

The invention having been disclosed, additional alternatives and variations according to the invention will, become apparent to persons skilled in the art. Reference should be made to the appended claims rather than the foregoing discussion of exemplary embodiments, to assess the scope of the invention in which exclusive rights are claimed.

What is claimed is:

1. An enclosure for electrical components such as computer printers, to be isolated from dust, comprising:
   a plurality of abutting walls defining an at least partial case forming a cavity, said case having at least one intake vent and at least one air outlet;
   air conditioning means having separate air input and air output sections;
   a horizontal support surface adjacent said case, said support surface adapted to hold the electrical components thereon;
   an, openable cover, sealingly engaging said support surface when closed;
   said air conditioning means being at least partially housed within said case, said air conditioning means drawing air through said at least one intake vent, said air conditioning means forcing conditioned air through said at least one outlet, said outlet being substantially adjacent said horizontal support surface, said closed cover sealingly encompassing said at least one air outlet, the electrical components and said horizontal surface whereby conditioned air from said outlet is trapped beneath said cover for preventing the ingress of dirt.

2. The enclosure recited in claim 1 wherein said air conditioning unit has means for cooling the air thereby cooling the electrical component.

3. The enclosure recited in claim 1 wherein said air conditioning unit has means for warming the air thereby warming the electrical component.

4. The enclosure recited in claim 1 wherein said air conditioning means dehumidifies the air.

5. The enclosure recited in claim 1 wherein said intake vent and said air outlet occupy separate horizontal planes, further comprising a barrier defining a plane bisecting the cavity into two sub-volumes, said barrier disposed between the horizontal planes of said air outlet and said intake vent, separating ambient air in said intake from conditioned air in said outlet.

6. The enclosure recited in claim 1 further comprising a secondary horizontal support shelf disposed beneath said horizontal support surface for storage of accessories.

7. The enclosure recited in claim 1 wherein said cover is hingingly attached to said support surface.

8. The enclosure recited in claim 1 further comprising vent apertures in any of said cover and said horizontal support surface for exhausting air conditioned air from the enclosure.

9. The enclosure recited in claim 1 wherein the cover is provided with a resilient insulating material about its edges to affect said sealing.

10. The enclosure recited in claim 1 further comprising filter means substantially aligned with said at least one intake vent in said case, said filter means being in relatively close engagement with said intake vent for filtering air drawn into said intake vent by the air conditioning unit's air input section.

11. The enclosure recited in claim 1 wherein said cover is essentially a horizontal surface with downwardly depending edges provided with a resilient insulating material for affecting said sealing.

12. The enclosure recited in claim 7 further comprising means for damping the movement of said hingingly attached openable cover.

13. The enclosure recited in claim 1 further comprising latch means for securing said cover in a closed state.

14. The enclosure recited in claim 1 further comprising switch means, whereby when said openable cover is at least partially opened, said switch means disables operation of the electrical component.

15. The enclosure recited in claim 11 wherein at least the horizontal surface of said cover is constructed of a transparent material for viewing the operation of the electrical component.

16. The enclosure recited in claim 1 further comprising wheels affixed to the enclosure for wheeled transporting of the enclosure.

17. The enclosure recited in claim 7 further comprising handle means affixed to said cover at an end of the cover opposite the hinges for opening and closing said cover.

18. The enclosure recited in claim 1 wherein the air conditioning means is a window mount air conditioner.

19. An enclosure for electrical components such as computer printers, to be isolated from dust having air intake and exhaust means, comprising:

a plurality of abutting walls defining an at least partial case forming a cavity, said case having at least one air intake vent and at least one air outlet;

air conditioning means having separate air input and air output sections, said unit being housed at least partially within said case;

a first horizontal support surface defining the top of said case, said first support surface adapted to hold the electrical components thereon;

an openable cover disposed adjacent said air outlet in said partial case;

whereby said cover sealingly encompasses said at least one air outlet and at least a side of the electronic component having air intake means and conditioned air from said air conditioning means is forced from said outlet in said case into said cover and the intake means of said electrical component.

20. The enclosure recited in claim 19 wherein said air conditioning unit has means for cooling the air thereby cooling the electrical component.

21. The enclosure recited in claim 19 wherein said air conditioning unit has means for warming the air thereby warming the electrical component.

22. The enclosure recited in claim 19 wherein said air conditioning means dehumidifies the air.

23. The enclosure recited in claim 19 wherein conditioned air is forced into the intake means of said electrical component at a rate higher than can be exhausted, thereby developing a positive pressure of conditioned air within the component for preventing ingress of dirt therein.

24. The enclosure recited in claim 19 further comprising at least one extended frame having two ends, one end of said at least one frame sealingly engaging said at least one air intake vent, the other end of said at least one frame sealingly engaging said air conditioning unit ambient air input section thereby separating input ambient air from output conditioned air within said cavity.

25. The enclosure recited in claim 19 further comprising a second horizontal support surface disposed adjacent said first horizontal support surface, said support surfaces vertically offset to occupy different horizontal planes, the vertical space between said support surfaces defining said case air outlet, said cover sealingly enclosing said second horizontal support surface.

26. The enclosure recited in claim 19 further comprising ventilation apertures in said first horizontal support surface for venting conditioned air to the bottom of the electrical component resting thereon.

27. The enclosure as recited in claim 26 further comprising an insulating border around the periphery of the first horizontal support surface to sealingly engage the bottom of the electrical component for trapping conditioned air flowing through said ventilation apertures against the bottom of the electrical component.

28. The enclosure recited in claim 19 wherein said cover perimeter is provided with a resilient insulating material to affect said sealed engagement.

29. The enclosure recited in claim 19 further comprising filter means substantially aligned with said at least one air intake vent in said case, said filter means being in relatively close engagement with said intake vent for filtering air drawn into said intake vent by the air conditioning means air input section.

30. The enclosure recited in claim 19 further comprising an openable door on said case for accessing said air conditioning unit.

31. The enclosure recited in claim 19 wherein said at least one air intake vent is provided with a lattice grille covering.

32. The enclosure recited in claim 25 wherein said cover is hingingly attached to said second horizontal support surface.

33. The enclosure as recited in claim 32 further comprising means for damping the movement of said hingingly attached openable cover.

34. The enclosure as recited in claim 19 further comprising latch means for securing said cover in a closed state.

35. The enclosure as recited in claim 19 further comprising switch means whereby when said attached openable cover is at least partially opened, said switch means disables operation of the electrical components.

36. The enclosure as recited in claim 19 wherein the cover is substantially constructed of transparent material for viewing the operation of the electrical component.

37. The enclosure as recited in claim 19 further comprising wheels affixed to said case for wheeled transporting of the enclosure.

38. The enclosure as recited in claim 19 further comprising handle means affixed to said cover for opening and closing said cover.

39. The enclosure as recited in claim 19 wherein the air conditioning means is a window mount air conditioner.

* * * * *

UNITED STATES PATENT AND TRADEMARK OFFICE
CERTIFICATE OF CORRECTION

PATENT NO.  : 5,056,331
DATED       : October 15, 1991
INVENTOR(S) : Paul B. Lotz It is certified that error appears in the above-identified patent and that said Letters Patent is hereby corrected as shown below:

In the Abstract, line 4, "along" should read --alone--.

Column 3, line 32, "an" should read --and--.

Column 7, line 31, "63" should be changed to "53", as per amendment.

Column 9, line 39, "affecting" should read --effecting--.

Column 9, line 63, add a comma after the word "dust", as per amendment.

Column 10, line 56, "affect" should read --effect--.

Signed and Sealed this

Twenty-second Day of June, 1993

Attest:

MICHAEL K. KIRK

Attesting Officer

Acting Commissioner of Patents and Trademarks